United States Patent Office 2,895,799
Patented July 21, 1959

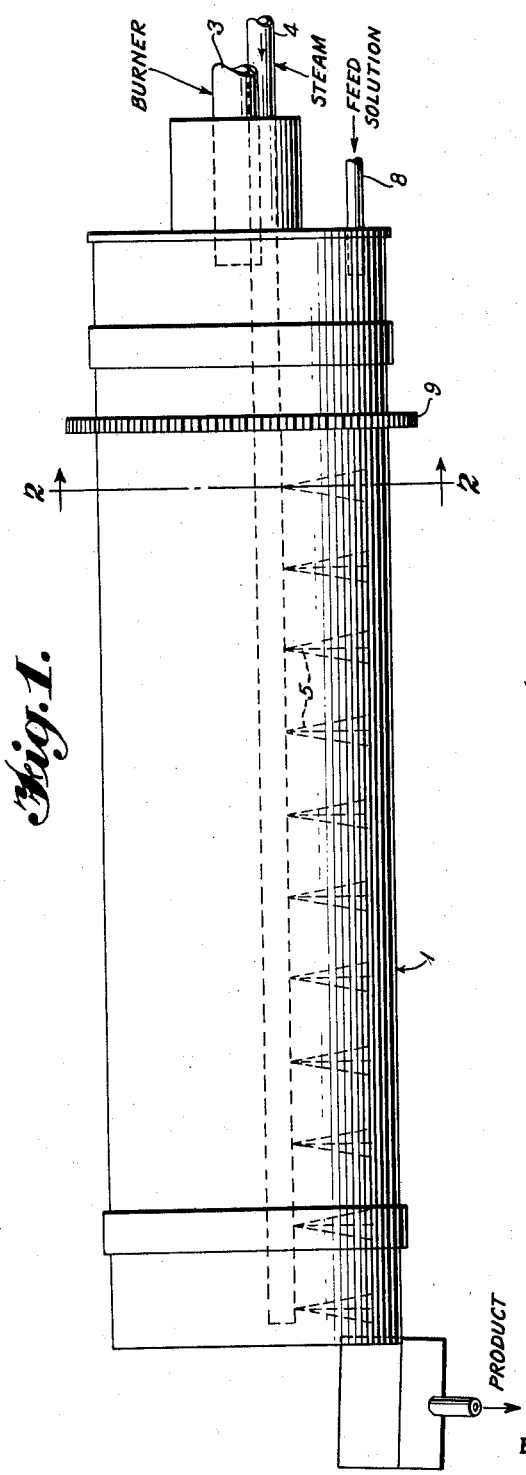
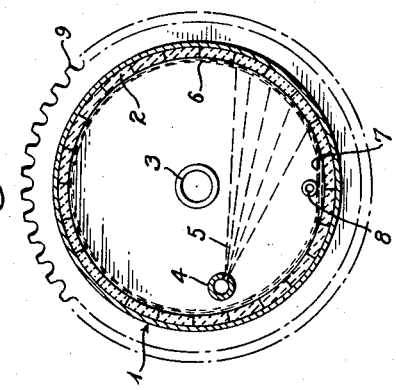

2,895,799

PROCESS FOR TREATING FLUORINE-CONTAINING PHOSPHATIC MATERIALS

Ira M. Le Baron and Elliott Northcott, Lakeland, Fla., assignors to International Minerals & Chemical Corporation, a corporation of New York Application September 19, 1955, Serial No. 534,967

11 Claims. (Cl. 23—109)

This invention relates to a process for producing phosphatic materials of reduced fluorine content. More particularly, the invention embraces a method wherein solutions of fluorine-containing phosphorus compositions are thermally defluorinated in film form through the combined action of heat and steam.

The economical commercial production from phosphate rock of phosphatic products of low fluorine content has challenged the art for many years. The various methods heretofore proposed may be classified in three broad categories. A first category embraces methods for the treatment of phosphate rock per se to reduce the fluorine content thereof. The second category embraces those methods which entail the treatment of a mixture of rock plus reagents, such as silica, water vapor, and limited quantities of acids, which are not effective to convert a significant proportion of the phosphorus pentoxide present in the rock into water-soluble form. The methods falling into these first two categories generally require heating the rock to be defluorinated to temperatures approaching or exceeding the rock fusion temperature and are, therefore, industrially unattractive.

The defluorination processes of the third category embrace reaction of the phosphate rock with reagents, such as mineral acids, under conditions and in concentrations which are effective to render at least a major portion of the phosphate values present in the rock water-soluble, aqueous extraction of the solubilized phosphate values, and chemical or thermal defluorination of the resulting extract. Chemical defluorination of such extracts is conventionally accomplished by the addition of an alkali metal or alkaline earth metal salt or base which is effective, under carefully controlled conditions, to form a precipitate containing substantially all of the fluorine initially present. Frequently, in such chemical defluorination processes, a substantial quantity of the phosphorus values which are present in the extract are lost to the fluorine-rich precipitate.

Methods proposed in the prior art for the thermal defluorination of phosphate rock extract solutions include the passage of superheated steam through a body of fluorine-containing phosphoric acid, the contact of combustion gases with fluorine-containing phosphoric acid, and the preheating of fluorine-containing phosphoric acid followed by spraying of the preheated acid into a warm atmosphere. Such prior art thermal defluorination processes fail to effect a satisfactory degree of defluorination in a reasonable time, and frequently require excessive amounts of heat or steam.

It is a primary object of the invention to provide a novel and economical method for the thermal defluorination of fluorine-containing phosphatic materials in aqueous solution.

It is another object of the invention to provide a process wherein fluorine-containing phosphoric acid or fluorine-containing phosphates in aqueous solution are defluorinated in the form of a film through the combined action of heat and steam.

It is a specific primary object of the invention to provide a process wherein a film of an aqueous solution of fluorine-containing phosphatic material is concurrently raised to an elevated temperature and directly contacted with a jet or spray or sparge of steam.

An additional object of the invention is to provide a process effective to reduce the fluorine content of aqueous phosphatic solutions formed by the reaction of limited amounts of particulate phosphate rock with phosphoric acid.

It is a further object of the invention to provide a method for defluorinating phosphate materials derived from phosphate rock to an extent requisite to render such materials suitable for the manufacture of animal feed supplements.

It is a specific object of the invention to provide a process wherein wet process phosphoric acid is formed into a heated film, which is directly contacted with a jet of steam to simultaneously concentrate and defluorinate the acid.

It is further specific object of the invention to provide a process wherein an aqueous solution formed by the reaction of a limited amount of phosphate rock with phosphoric acid, and comprising phosphoric acid and a solution of monocalcium phosphate, is formed into heated film and contacted with steam to reduce the fluorine content of the phosphatic materials present.

It is a further specific object of the invention to provide a process for the defluorination of phosphatic materials to produce a defluorinated product having an elemental phosphorus to elemental fluorine weight ratio of at least about 100, and preferably at least about 200.

It is a further object of the invention to provide a process for the removal of the fluorine which is present in phosphate rock under conditions and in a form in which such fluorine can be efficiently recovered.

The process of the invention comprises heating a film of an aqueous solution of a fluorine-containing phosphatic material to an elevated temperature and contacting said film while said heating is being effected with a substantial quantity of steam other than that inherently produced in the process.

The successful practice of the invention entails the combined steps of (a) forming a film of phosphatic material to be defluorinated, and (b) heating such film to an elevated temperature, while (c) contacting the heated film with a substantial amount of steam other than that which might inherently be formed in the process, for example, by the volatilization of water from the aqueous medium containing the phosphatic material. Steam is also inherently formed in that embodiment of the invention where the film of phosphate-containing material is heated by direct contact with combustion gases, which necessarily contain steam. This invention contemplates and requires contacting the film containing the material to be defluorinated with a substantial amount of steam other than such inherently produced steam.

The invention requires as an essential feature that the solution of phosphatic material to be defluorinated be formed into a film. It will be appreciated, however, that the invention does not require the fluorine-containing phosphatic feed solution to be wholly free of undissolved solids. It is required only that the undissolved solids concentration in the solution to be defluorinated be not so great as to preclude the requisite film formation. The term "film" is accordingly embracive of thin layers such as result from the passage of a liquid or a flowable slurry downwardly over the surface of an inclined plane. Generally, the fluorine-containing phosphatic feed solutions treated in accordance with the method of the invention do not contain more than about 15% by weight of undissolved solids, preferably the feed solutions do not contain more than about 10% by weight of undissolved solids.

An economically significant specific embodiment of the invention embraces the defluorination of aqueous compositions resulting from the reaction of limited amounts of phosphate rock with phosphoric acid. In the practice of this embodiment of the invention, the feed material is prepared by reacting particulate phosphate rock with phosphoric acid in proportions such that in the resulting composition the ratio of phosphorus pentoxide derived from the added phosphate rock to phosphorus pentoxide derived from the acid does not exceed about 0.1. Preferably, this ratio does not exceed about 0.08.

When the specified proportions of phosphoric acid and phosphate rock are reacted, the phosphate rock substantially completely dissolves, and the resulting composition comprises essentially an aqueous solution of phosphoric acid and monocalcium phosphate having suspended therein small quantities of acid-insoluble materials together, in some cases, with small amounts of dicalcium phosphate and unreacted rock. Such compositions generally do not contain more than about 15% by weight of undissolved solids. The calcium oxide to phosphorus pentoxide mole ratio of such compositions generally does not exceed about 0.4, and preferably is not more than about 0.35.

In the preferred practice of the invention for the production of phosphatic materials useful as animal feed supplements, there is employed at least about 2.5 parts by weight of steam, other than that formed inherently in the process, for each part by weight of phosphorus pentoxide present in the phosphatic material to be defluorinated. An appropriate range is from about 10 parts by weight of steam for each part by weight of phosphorus pentoxide present in the material processed. While a primary advantage of the invention resides in the economies with respect to steam consumption which result therefrom, it will be appreciated that there is no upper limit on the amount of steam employed. Hence, 100 parts or more by weight of steam for each part by weight of phosphorus pentoxide can be utilized. Similarly, inasmuch as the benefits of the invention flow from the combined steps of forming a film of an aqueous solution of phosphatic material to be defluorinated and heating such film to an elevated temperature while directly contacting the film surface with a jet or spray of steam, there is no minimum critical amount of steam. However, when the invention is practiced for the production of phosphatic material for use in animal feed supplements, the specified minimum steam concentration should be observed. The steam temperature is not critical. If desired, the steam can be superheated, for example, to a temperature of between about 330° F. and 350° F., although the use of superheated steam is not essential. Steam, preferably saturated, at a pressure of at least about thirty, preferably fifty to about one hundred pounds per square inch, is satisfactory. In at least some applications of the invention it is expedient to maintain the temperature of the steam below the temperature of the film of fluorine-containing phosphatic material processed.

The method of the invention is carried out under conditions requisite to produce a fluid or flowable product containing phosphate material of reduced fluorine content. In the preferred practice of the invention, the film of fluorine-containing phosphatic material to be defluorinated is simultaneously contacted with steam and raised to a temperature of at least about 100° F. For the production of a product useful in the manufacture of phosphate animal feed supplements, the film of fluorine-containing phosphatic material is heated to a temperature of at least about 300° F., and more appropriately to a temperature of at least about 450° F. to about 550° F.

The maximum temperature to which the film of phosphatic material is raised in the process is a function of the chemical composition desired in the final product and of the requirement that a flowable product be discharged from the process. It has been determined that if the film of material being treated is heated to a temperature in excess of 600° F. for a substantial period of time, aqua regia insoluble metaphosphates of aluminum and iron are formed which may be objectionable in some cases. If formation of such metaphosphates is unobjectionable in a particular operation, substantially any desired product temperature consistent with the discharge of a flowable product from the process can be employed. For example, maximum film temperatures on the order of 800° F. and higher are contemplated. Generally speaking, temperatures are employed which do not effect complete volatilization of water from the film of material undergoing defluorination. This is particularly true in the case of defluorination of phosphoric acid as such. When reaction mixtures of phosphoric acid and phosphate rock are employed as the material to be defluorinated, temperatures on the order of 800° F. may result in substantially complete volatilization of the water present. However, in all cases a fluid or flowable product is produced, as required by the invention. It will be appreciated that the present invention does not contemplate, however, the processing of molten phosphatic materials, which is commercially unattractive due to problems which do not attend the method of this invention.

The film of solution of phosphatic material to be defluorinated can be heated either directly, as by contact with hot combustion gases, or indirectly, as in a jacketed cylinder or like vessel. The film of solution of phosphatic material to be defluorinated is simultaneously raised in temperature and contacted with steam. Preferably, in the production of products to be employed in the manufacture of feed supplements, the film is contacted with steam for a period of at least about ten minutes, and more appropriately for about twenty to about forty-five minutes after reaching a temperature of at least 300° F. Normally, the film is raised to a temperature in excess of 300° F. during the above-described period of steam contact.

One form of apparatus in which the process of the invention can be practiced is shown in the drawings in which:

Figure 1 is a schematic longitudinal sectional view of an apparatus suitable for the practice of the invention; and Figure 2 is a vertical section taken on line 2—2 of Figure 1.

Referring to the drawings, there is shown a rotary drum 1, which may appropriately be about 27 feet long and have an internal diameter of about 34 inches, lined with corrosion-resistant material, such as carbon or graphite brick 2. The rotary drum is preferably inclined from the horizontal, for example, at a slope of about 0.275 inch per foot to permit the flow of treated material therethrough. The inlet end of the rotary drum is provided with a conventional oil burner 3 mounted centrally thereof. A steam inlet and sparge 4 provided with a series of steam jets 5 spaced therealong extends longitudinally into the lower section of the drum.

The drum 1 is further provided with an inlet or conduit 6 for the introduction of solutions of phosphatic material to be defluorinated. The discharge end of the drum 1 is fitted with appropriate product receiving and distribution means 7. The discharge end of the drum may also be provided with stack means, not shown, for the removal of steam and combustion gases. Such stack means can appropriately be connected to scrubber apparatus of conventional design effective to remove fluorine-containing products from the discharged steam and combustion gases.

In operation of the apparatus shown in the drawings, the burner 3 is ignited and introduces combustion gases into the interior of the drum 1. Steam at a temperature on the order of 340° F. is introduced at a pressure of about 40 to 80 pounds per square inch gauge into the sparge 4 and exits through the jets 5. An aqueous solution comprising phosphatic material to be defluorinated, such as wet process phosphoric acid, is introduced through conduit 6 at a rate requisite to form a small pool 8 in the bottom of the drum 1, which is rotated at a speed such as about 15 to 20 revolutions per minute, requisite to form a film 9 of solution covering substantially the entire inner wall of said drum. The jets 5 are positioned to project steam against the film 9 immediately after it is formed. The film is heated to the desired temperature in the course of passage through the apparatus. A product of reduced fluorine content is discharged into the product receiving and distribution means 7.

The apparatus, as above described, permits the preferred practice of the method of the invention by concurrent passage of the fluorine-containing phosphate solution, steam, and combustion gases through the rotary kiln with respect to the steam and combustion gases. For countercurrent operation, the apparatus shown in Figures 1 and 2 can be modified in obvious manner by positioning the burner 3 and the steam inlet and sparge 4 at the low end of the kiln 1. Except for the countercurrent flow which inherently results from such change, the operation is the same as that described with respect to Figures 1 and 2.

The following examples are illustrative of the practice of the invention.

*Example I*

Wet process phosphoric acid containing about 54% by weight of phosphorus pentoxide and having an elemental phosphorus to elemental fluorine weight ratio of fifteen was defluorinated by the method of the invention in an apparatus of the type shown in the drawings.

The acid to be defluorinated was introduced through the conduit 6 at a rate requisite to provide about 460 pounds of phosphorus pentoxide per hour, while the drum 1 was rotated at a speed of about 15 revolutions per minute to form a film of acid substantially covering the interior of the drum, the film being maintained as the drum was rotated by a small pool of acid, such as the pool 7 shown in Figure 2, which formed in the bottom of the drum.

The burner 3 was ignited and provided combustion gases which exited from the drum 1 at a temperature of about 515° F. The acid in the course of passage through the drum 1 was raised to a temperature of about 425° F. Steam at a pressure of about 40 to 80 pounds per square inch gauge was introduced through the conduit 4 and outwardly through the jets 5 against the film of acid on the wall of drum 1. Steam was employed in an amount requisite to provide about 3½ pounds thereof for each pound of phosphorus pentoxide present in the acid passed through the drum 1.

The defluorinated product acid recovered through the product discharge means 7 was characterized by an elemental phosphorus to elemental fluorine weight of ratio of 445.

*Example II*

Example I was repeated with the exception that no steam was employed. The product acid was characterized by an elemental phosphorus to elemental fluorine weight ratio of 51.

*Example III*

Example I was repeated with the exception that the acid to be defluorinated was introduced at a rate requisite to provide about 430 pounds of phosphorus pentoxide per hour and about 2 pounds of steam were employed for each pound of phosphorus pentoxide present in the acid feed. The product was characterized by an elemental phosphorus to elemental fluorine weight ratio of 301. The product temperature at the time of discharge was not determined.

*Example IV*

Example I was repeated with the exception that in this instance there was employed a feed solution formed by reacting about 16 parts by weight of particulate phosphate rock containing about 3.8% by weight fluorine with 100 parts by weight of the phosphoric acid described in Example I. The resulting composition contained about .1 pound of phosphorus pentoxide derived from the added rock for each one pound of phosphorus pentoxide initially present in the phosphoric acid and was characterized by a mole ratio of calcium oxide to phosphorus pentoxide of about 0.37. The composition embraced a solution of monocalcium phosphate and phosphoric acid, and contained acid insoluble materials which were present in the added rock. The material was a thin, flowable slurry containing about 10% solids which readily formed a film in the apparatus and under the conditions employed.

The elemental phosphorus to elemental fluorine weight ratio of the resulting product was about 220. About 95% of the total amount of fluorine present in the material subjected to the process was removed.

*Example V*

In this example there was employed an apparatus similar to that described in Example I, but modified to achieve indirect heating by combustion gases of the film of material to be defluorinated. More specifically, the rotary drum in the apparatus employed in this example was about 18 inches in diameter and about ten feet long. The drum was positioned in a housing constructed and arranged to provide a generally annular space surrounding the drum. The burner was positioned and connected to introduce combustion gases into such annular space. The combustion gases were withdrawn from a stack positioned adjacent the discharge end of the drier. Phosphoric acid was introduced into the interior of the drum in the same manner and by like means as described in Example I.

Wet process phosphoric acid containing about 54% by weight of phosphorus pentoxide, about 1.8% by weight of fluorine, was defluorinated in the above-described apparatus. The acid was introduced into the apparatus at a rate requisite to supply about 76 parts by weight of phosphorus pentoxide per hour which was effective to provide a small pool on the interior of the rotary drum, and to provide a thin film of phosphoric acid on the inner wall of the drum when the drum was rotated at a speed of about 15 to 20 r.p.m. Combustion gases were introduced into the annular space surrounding the rotary drum to heat the phosphoric acid to a final discharge temperature of about 425° F. The temperature of the combustion gases when discharged from the annular space surrounding the drum was about 420° F. About 4.76 pounds of steam for each pound for phosphorus pentoxide present in said acid was passed through the interior of said drum concurrently with the passage of the acid film therethrough. The steam employed was saturated steam at a temperature of about 340° F. Steam was maintained in contact with the acid film for about 15 minutes.

A product was obtained in the form of a concentrated aqueous phosphoric acid composition having a phosphorus to fluorine weight ratio of about 242. About 95% by weight of the fluorine initially present in the acid was removed.

*Example VI*

The process of Example V was repeated with the exception that in this instance the film of phosphoric acid being defluorinated was raised to a final temperature of about 590° F. Also in this example, there was employed about 7 pounds of steam for each pound of phosphorus pentoxide present in the phosphoric acid defluorinated. The phosphoric acid was passed through the rotary drum at a rate requisite to provide about 52.8 pounds of phosphorus pentoxide per hour. The elemental phosphorus to fluorine weight ratio of the resulting product was about 246.

Example VII

The process of Example I was substantially repeated with the exception that in this instance there was employed wet process phosphoric acid containing about 26% by weight of phosphorus pentoxide and about 2.5% by weight of fluorine. Combustion gases were introduced into the rotary drum at a rate and under conditions effective to raise the product temperature at the time of discharge to about 565° F. The temperature of the exhaust gases was about 600° F. About 25 pounds of steam were employed for each pound of phosphorus pentoxide present in the phosphoric acid defluorinated. The phosphoric acid was introduced into the rotary drum at a rate requisite to provide about 16.4 pounds of phosphorus pentoxide per hour. The elemental phosphorus to elemental fluorine weight ratio of the resulting product was about 1130.

Example VIII

This example was carried out in an apparatus similar to that described in Example V and having an internal diameter of only about 8 inches. In this example, wet process phosphoric acid containing 26% phosphorus pentoxide and having an initial weight ratio of phosphorus to fluorine of about 4.5 was introduced into the rotary drum at a rate requisite to provide about 18 pounds of phosphorus pentoxide per hour. Combustion gases were introduced into the annular space surrounding the rotary drum at a rate requisite to raise a film of phosphoric acid formed on the interior of the drum as the drum is rotated at a speed of about 15 to 20 r.p.m. to a final temperature of about 310° F. The temperature of the discharged stack gases was about 475° F. Approximately 21 pounds of steam were introduced for each pound of phosphorus pentoxide present in the acid feed material. The contact time of the heated film with the steam was about twenty minutes. A fluid product having an elemental phosphorus to fluorine weight ratio of about 450 was obtained, about 99% by weight of the fluorine initially present in the phosphoric acid being eliminated in the process.

The process of the invention is applicable to the defluorination of fluorine-containing phosphatic materials in aqueous solution regardless of source or origin. Conventionally, such materials are derived from phosphate rock by methods well known to the art which entail the treatment of the rock with reagents effective to solubilize a predominant portion of the phosphate values present followed by extraction of the rock with an aqueous medium to separate the soluble phosphate values from the acid insoluble materials. It will be appreciated that the particular nature and source of the phosphate rock from which such fluorine-containing phosphatic solutions are obtained are not material to this invention.

The product of the invention finds particular application in the manufacture of animal feed supplements which can appropriately be formed by reaction of the product of the invention with an appropriate amount of calcium carbonate or other calcium base to provide essentially nonhygroscopic monocalcium phosphate and dicalcium phosphate products.

It will be appreciated that the process of the invention is not restricted to the specific procedural and mechanical embodiments specifically described. Any desired mode of operation and apparatus can be employed. One appropriate alternative form of apparatus takes the form of an inclined flat plate, which may appropriately be of metal, and which is positioned in a suitable housing, the plate being associated with burner or other means for directly or indirectly heating a film of liquid, such as a solution of fluorine-containing phosphatic material flowing downwardly over the upper surface thereof, and also with steam jet means for impinging jets of steam upon the descending hot film. The solution of phosphatic material to be defluorinated can be poured or otherwise distributed at the top of the plate, either mechanically or by hand.

The foregoing portions of this specification set forth the best modes presently known to the applicants for the practice of this invention. The invention is restricted only by the scope of the appended claims.

We claim:

1. A defluorination process which comprises forming a film of an aqueous solution of a fluorine-containing acidic phosphatic material selected from the group consisting of orthophosphoric acid, monocalcium phosphate and mixtures thereof, heating said film to a temperature of at least about 300° F., but below the melting point of the phosphatic material when it is in the solid phase and directing extraneously produced steam against the surface of said film while said heating is being effected, to produce a product containing phosphatic material of reduced fluorine content.

2. A process as in claim 1 wherein the extraneously produced steam is jetted against the phosphatic film in an amount of at least 2.5 lbs. of steam per pound of phosphorus pentoxide present in the phosphatic material being defluorinated.

3. A process as in claim 1 wherein the phosphatic material being defluorinated is orthophosphoric acid.

4. A process as in claim 1 wherein the temperature of the film is maintained between about 450 and about 550° F.

5. A defluorination process which comprises introducing an aqueous solution of a fluorine-containing acidic phosphatic material selected from the group consisting of orthophosphoric acid, monocalcium phosphate and mixtures thereof, into a rotary drum at a rate requisite to provide a small pool of said solution in the bottom of said drum, rotating said drum at a rate requisite to form a film of said solution on the walls of said drum, heating said film to a temperature of at least 300° F. and below the melting point of the phosphatic material in the solid phase and simultaneously directing extraneously produced steam against the exposed surface of said film while said heating is being effected to produce a product containing phosphatic material of reduced fluorine content.

6. A process as in claim 5 wherein the extraneously produced stream is jetted against the phosphatic film in an amount of at least 2.5 lbs. of steam per pound of phosphorus pentoxide present in the phosphatic material being defluorinated.

7. A process as in claim 5 wherein the acidic phosphatic material is orthophosphoric acid.

8. A process as in claim 5 wherein the temperature of the film is maintained between about 450 and about 550° F.

9. A continuous process for defluorinating acidic phosphatic materials in aqueous solution and selected from the group consisting of orthophosphoric acid, monocalcium phosphate and mixtures thereof, which comprises continuously introducing said solution in the upper end of an inclined rotary drum at a rate requisite to form a small pool in the bottom of said drum, rotating said drum to form a film of said solution on the inner wall thereof as said solution flows generally toward the lower end of said drum, continuously contacting said film with combustion gases passing through said drum in a direction concurrent to the flow of said solution therethrough to raise said film to a temperature of at least about 300° F. and below the melting point of the phosphatic material when it is in the solid phase, simultaneously contacting said film with extraneously produced steam in an amount requisite to provide 2½ parts by weight of steam for each part by weight of phosphorus pentoxide in said film, said steam being maintained in contact with said film for at least about 10 minutes, and continuously discharging from the lower end of said drum a flowable composition containing phosphatic material of reduced fluorine content.

10. A process as in claim 9 wherein the extraneously produced and added steam is directed against the said film of phosphatic material in the form of a jet and wherein said film is heated to a temperature between about 450 and about 550° F.

11. A continuous process for defluorinating acidic phosphatic materials in aqueous solution and selected from the group consisting of orthophosphoric acid, monocalcium phosphate and mixtures thereof, which comprises continuously introducing said solution in the upper end of an inclined rotary drum at a rate requisite to form a small pool in the bottom of said drum, rotating said drum to form a film of said solution on the inner wall thereof as said solution flows generally toward the lower end of said drum, contacting said film with combustion gases passing through said drum in a direction concurrent to the flow of said solution therethrough to raise said film to a temperature of at least about 300° F. and below the melting point of the phosphatic material when it is in the solid phase, simultaneously contacting said film with extraneously produced steam from a plurality of jets longitudinally spaced along the length of and within said drum, said steam being employed in an amount requisite to provide at least about 2½ parts by weight of steam for each part by weight of phosphorus pentoxide in said film, the said steam being maintained in contact with said film for at least about 10 minutes, and continuously discharging from the lower end of said drum a flowable composition containing phosphatic material of reduced fluorine content.

References Cited in the file of this patent

UNITED STATES PATENTS

| | | |
|---|---|---|
| 2,021,671 | Skinner | Nov. 19, 1935 |
| 2,093,176 | Tromel | Sept. 14, 1937 |
| 2,143,865 | Copson | Jan. 17, 1939 |
| 2,220,575 | Luscher | Nov. 5, 1940 |
| 2,360,197 | Butt | Oct. 10, 1944 |

UNITED STATES PATENT OFFICE

CERTIFICATE OF CORRECTION

Patent No. 2,895,799                         July 21, 1959

Ira M. Le Baron et al.

It is hereby certified that error appears in the printed specification of the above numbered patent requiring correction and that the said Letters Patent should read as corrected below.

Column 3, line 33, after "about" insert -- 3 to about --.

Signed and sealed this 19th day of January 1960.

(SEAL)
Attest:

KARL H. AXLINE
Attesting Officer

ROBERT C. WATSON
Commisioner of Patents